Dec. 17, 1929.  W. J. CHISHOLM  1,740,333
ANIMAL TRAP
Filed Nov. 9, 1927   2 Sheets-Sheet 1

W. J. Chisholm
INVENTOR
BY Victor J. Evans
ATTORNEY

Dec. 17, 1929.  W. J. CHISHOLM  1,740,333
ANIMAL TRAP
Filed Nov. 9, 1927  2 Sheets-Sheet 2
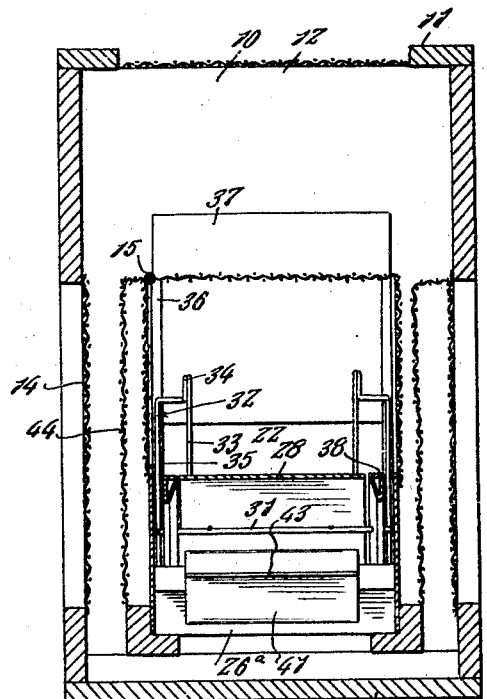
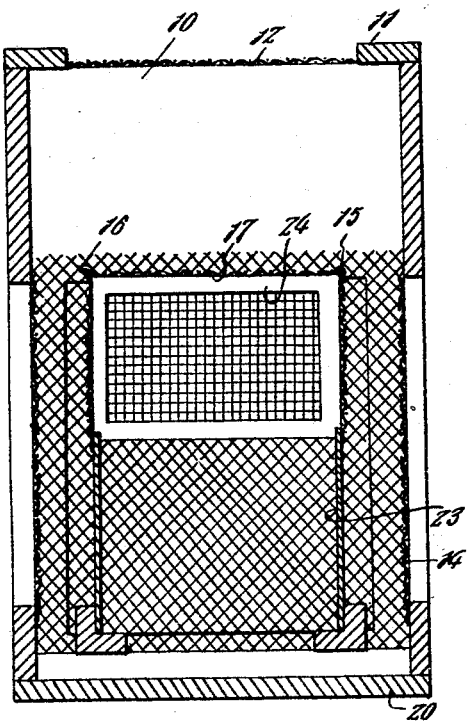
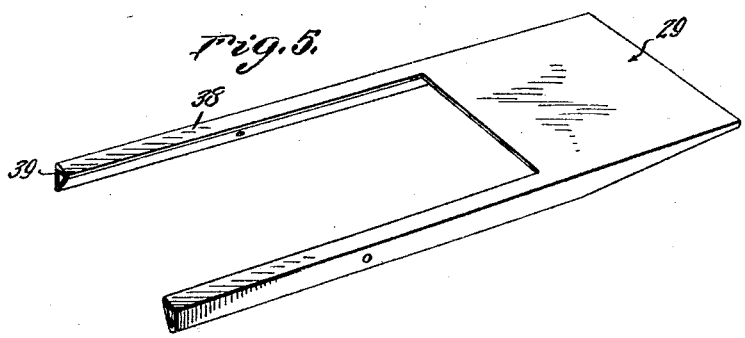
W. J. Chisholm
INVENTOR
BY Victor J. Evans
ATTORNEY Patented Dec. 17, 1929

1,740,333

UNITED STATES PATENT OFFICE

WALTER JACKSON CHISHOLM, OF WACO, TEXAS

ANIMAL TRAP

Application filed November 9, 1927. Serial No. 232,110.

The present invention relates to animal traps and particularly to that type of trap which combines a victim-set feature with an ever-set feature.

Objects of the invention are to provide a trap in which a plurality of animals may be caught and retained therein without manually resetting the trap.

Other objects are to provide a yieldable platform in combination with a tiltable platform, whereby an entrance to the trap will be sprung when the animal treads upon the yieldable platform and will be reset when he treads upon the end of the tiltable platform opposite to the entrance opening and whereby when the animal treads upon the tiltable platform it will be precipitated into a closed chamber, the tiltable platform returning to closed position after the animal has entered the closed chamber.

A further object is to provide means in connection with the yieldable platform to yieldably hold the closure at the entrance opening in set position.

Other objects are simplicity of construction, cheapness of manufacture, simplicity of operation and effectiveness in use.

A still further object is to so construct the trap that it may be readily taken apart for cleaning and for other purposes.

Other objects and advantages will appear from the following description and will be set forth in the subjoined claims, and I do not wish to be limited in the scope of my invention except as I shall be limited by said claims.

In the drawings:

Figure 3 is a section on the line 3—3 of Figure 1, looking in the direction of the arrows.

Figure 4 is a section on the line 4—4 of Figure 1, showing the end construction of the entrance compartment.

Figure 5 is a detail view of the tiltable platform.

Figure 1:
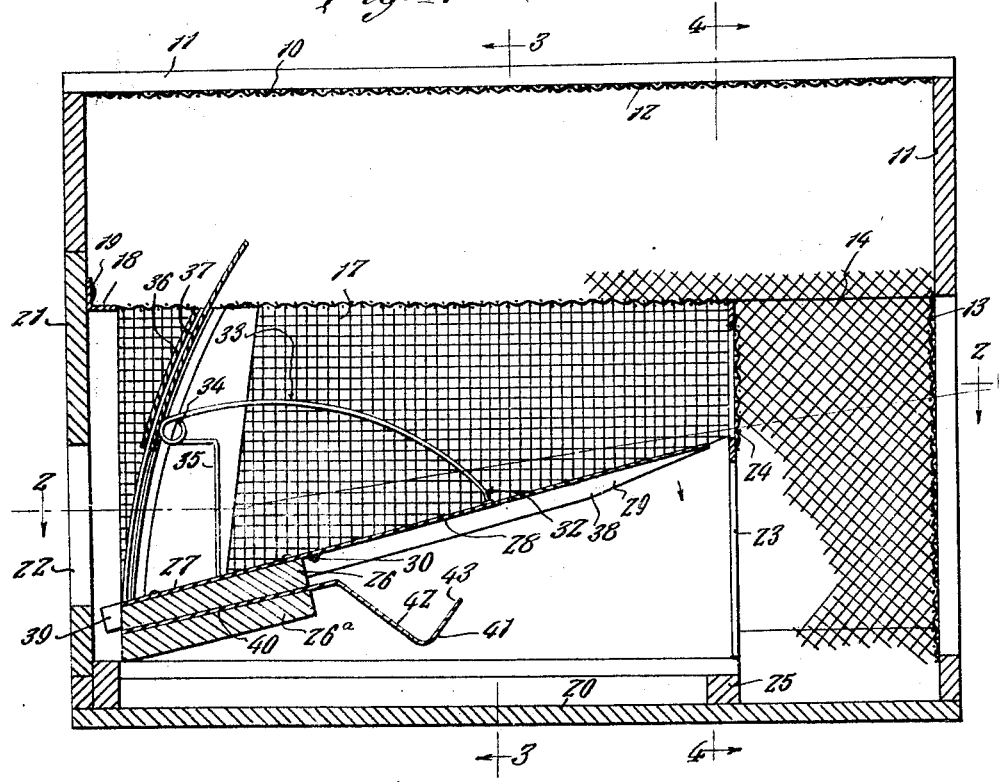
Figure 1 is a longitudinal section of Figure 2, showing the internal construction of the trap.
Figure 2:
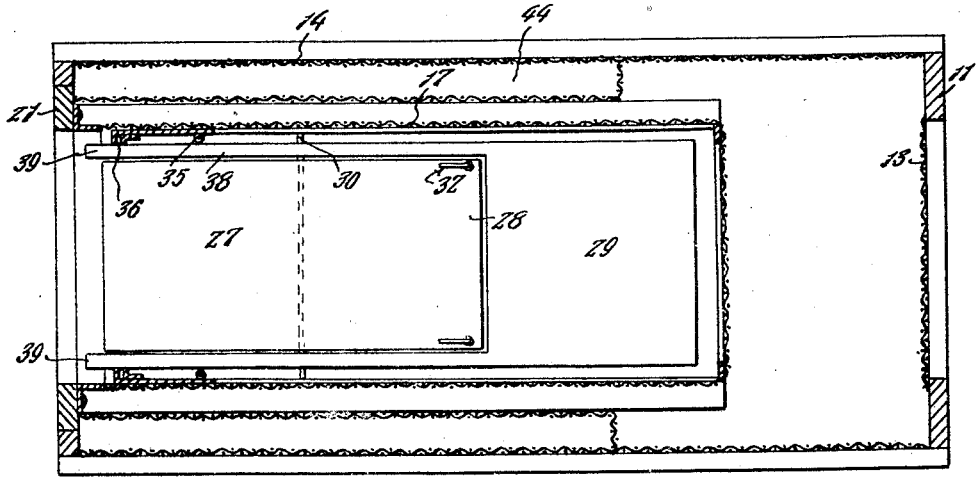
Figure 2 is a section on the line 2—2 of Figure 1 looking in the direction of the arrows and showing the relation of the yieldable platform to the tiltable platform

Referring to the drawings in detail, 10 designates a trap chamber which may be of any suitable construction as of wood or sheet metal frame 11 having foraminous portions 12, 13 and 14 covering respectively openings in the top, rear, end and sides. The covering 17 at the top may be so arranged as to be hinged at one side as at 15 and latched at the other side as at 16 in order to dislodge the animal caught in the trap therefrom.

Located within the trap chamber is an entrance chamber 17 having its top, side and end walls preferably of foraminous material and provided at its forward end with a binding strip 18 preferably of sheet metal bent to conform to the forward end of the entrance chamber and having formed thereon a flange 19, whereby the entrance chamber may be attached to the forward end of the trap chamber. The trap chamber is provided with a non-foraminous bottom 20 and a non-foraminous front wall 21, the latter having an entrance opening 22 formed therein around which the forward end of the entrance chamber is positioned. The entrance chamber may be open on its bottom and is provided with an opening 23 in the lower portion of the rear wall 24, the frame of the entrance chamber 25 seating on the bottom of the trap chamber and said entrance chamber is provided at its forward end with a support 26ª to which is attached a platform 27 of yieldable material, as sheet metal, one end 28 thereof extending beyond the support and lying in an upwardly and rearwardly inclined position.

A tiltable platform 29 is provided having a transverse pivotal pin 30 secured thereto projecting beyond the sides thereof and journaled in suitable supports, the pin 30 being located substantially midway between the ends of the tiltable platform. The arrangement of the tiltable platform and the yieldable platform is such that the tiltable platform normally forms a continuation of the yieldable platform both to the side and rearwardly thereof and when in normal position the tiltable platform closes the opening 23 at the rear of the entrance chamber. The yieldable platform is provided with spring members 32 which are attached thereto adjacent the free end 28 thereof and having upwardly and forwardly curved portions 33 merging into coils 34 from which the spring members extend rearwardly and then downwardly at the sides of the tiltable platform, as indicated at 35. The sides of the entrance chamber are provided with slideways 36 which are preferably arcuate in shape and serve as guideways for a trap closing door 37 which is also arcuate in shape and adapted to ride in said guideways. The side members 38 of the tiltable platform extend in parallelism with the sides of the yieldable platform and project at 39 slightly forwardly thereof and lie in the path of the closing door 37, forming a support therefor when the said door is closed. The coiled portions 34 of the spring members 32 are so constructed and arranged as to bear against the inner surface of the arcuate closing door and to bear thereagainst with such pressure that it will hold the said door in raised position until the tension is weakened by the tread of an animal upon the yieldable platform, whereupon the pressure will be relieved and the door 37 will be allowed to drop to closed position. When the animal, finding itself trapped and seeing the light through the rear, attempts to escape in that direction, he will tread upon the tiltable platform which will yield under pressure, precipitating the animal through the opening 23 into the trap chamber and by this operation the forward end of the side members 38 of the tiltable platform will be moved upwardly, carrying therewith the closing door to its open position. The pressure on the yieldable platform being released the springs 32 will operate to hold the door in this position.

Positioned beneath the yieldable platform and held between the member 26 and a member 26ᵃ is a sheet metal member 40 having a tongue 41 bent first downwardly as at 42 and then upwardly as at 43 to form a yieldable abutment for the yieldable platform to prevent too great a downward movement thereof. Bait pockets may be provided as at 44 at the sides of the tiltable platform, in which any suitable bait may be placed depending on the type of animal to be trapped. Bait in these compartments will attract the animal without his being able to consume the same.

This trap, it will be understood, may be made in various sizes to adapt it for the trapping of all sizes of animals, from a tiny mouse to the larger fur bearing animals such as ming, otter, pole cats and the like.

Having described my invention, what I claim is:

1. An animal trap comprising a trapping chamber having an opening in one wall thereof, a vertically slidable door controlling said opening, an entrance chamber located therein and supported by said end wall in a line with said opening, said entrance chamber including a rear wall having an opening therein, and an outwardly inclined yieldable platform constituting a part of the bottom of said chamber, spaced identically constructed springs arranged within the entrance chamber, each including a vertical portion, and a longitudinally and downwardly curved portion connected with said yieldable platform, and an offset coil connecting said respective portions and arranged to engage said sliding door to normally maintain the latter in an opened position, and a tilting platform supporting said door when closed and terminating above the opening in the rear wall of said entrance chamber.

2. An animal trap comprising a trapping chamber having an opening in one wall thereof, a vertically slidable door controlling said opening, an entrance chamber located therein and supported by said wall in a line with said opening, said entrance chamber including a rear wall having an opening therein, and an upwardly inclined yieldable platform constituting a part of the bottom of said entrance chamber, spaced identically constructed springs arranged within the entrance chamber and terminally connected with the yieldable platform, each spring including a coil arranged to engage said sliding door to normally maintain the latter in an opened position, a tilting platform supported within the entrance and including a body portion normally arranged in end to end relation with said platform to form a continuity of the bottom of said entrance chamber, and spaced parallel members projecting from the forward end of the platform and arranged at opposite sides of the yieldable platform and extending in advance of the latter to support said door, whereby the latter is shifted to support the door in its closed position, and means for limiting the movement of the tilting platform in one direction.

In testimony whereof I affix my signature.

WALTER JACKSON CHISHOLM.